US009570076B2

(12) United States Patent
Sierawski et al.

(10) Patent No.: US 9,570,076 B2
(45) Date of Patent: Feb. 14, 2017

(54) METHOD AND SYSTEM FOR VOICE RECOGNITION EMPLOYING MULTIPLE VOICE-RECOGNITION TECHNIQUES

(71) Applicant: Google Technology Holdings LLC, Mountain View, CA (US)

(72) Inventors: Jeffrey A Sierawski, Wauconda, IL (US); Boris Bekkerman, Highwood, IL (US); Michael P Labowicz, Palatine, IL (US); Kazuhiro Ondo, Buffalo Grove, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 395 days.

(21) Appl. No.: 13/774,398

(22) Filed: Feb. 22, 2013

(65) Prior Publication Data

US 2014/0122071 A1 May 1, 2014

Related U.S. Application Data

(60) Provisional application No. 61/719,983, filed on Oct. 30, 2012.

(51) Int. Cl.
*G10L 15/26* (2006.01)
*G10L 15/08* (2006.01)
(Continued)

(52) U.S. Cl.
CPC ............. *G10L 15/26* (2013.01); *G06F 3/167* (2013.01); *G10L 15/18* (2013.01); *G10L 15/32* (2013.01);
(Continued)

(58) Field of Classification Search
CPC .... G10L 15/26; G10L 2015/088; G10L 15/32; G10L 15/18; H04M 1/72519; H04M 1/72552; H04M 2250/74; G06F 3/167
(Continued)

(56) References Cited

U.S. PATENT DOCUMENTS

| 5,117,460 A | * | 5/1992 | Berry | ....................... G10L 15/00 340/7.39 |
| 5,231,670 A | * | 7/1993 | Goldhor | .................... G06F 3/16 704/275 |

(Continued)

FOREIGN PATENT DOCUMENTS

EP  0736211  3/2004

OTHER PUBLICATIONS

Patent Cooperation Treaty, "PCT Search Report and Written Opinion of the International Searching Authority" for International Application No. PCT/US2013/062545 dated Dec. 16, 2013, 14 pages.

(Continued)

*Primary Examiner* — Tammy Paige Goddard
*Assistant Examiner* — Edwin S Leland, III
(74) *Attorney, Agent, or Firm* — Fish & Richardson P.C.

(57) ABSTRACT

A method and system for voice recognition are disclosed. In one example embodiment, the method includes receiving voice input information by way of a receiver on a mobile device and performing, by way of at least one processing device on the mobile device, first and second processing operations respectively with respect to first and second voice input portions, respectively, which respectively correspond to and are based at least indirectly upon different respective portions of the voice input information. The first processing operation includes a speech-to-text operation and the second processing operation includes an alternate processing operation. Additionally, the method includes generating recognized voice information based at least indirectly upon results from the first and second processing operations, and performing at least one action based at least in part upon the recognized voice information, where the at least one action includes outputting at least one signal by an output device.

20 Claims, 3 Drawing Sheets

(51) Int. Cl.
*G06F 3/16* (2006.01)
*G10L 15/18* (2013.01)
*H04M 1/725* (2006.01)
*G10L 15/32* (2013.01)

(52) U.S. Cl.
CPC ..... *G10L 2015/088* (2013.01); *H04M 1/72519* (2013.01); *H04M 1/72552* (2013.01); *H04M 2250/74* (2013.01)

(58) Field of Classification Search
USPC .......................................................... 704/235
See application file for complete search history.

(56) References Cited

U.S. PATENT DOCUMENTS

| | | | | |
|---|---|---|---|---|
| 6,233,559 | B1* | 5/2001 | Balakrishnan | G06F 3/16 704/270.1 |
| 6,446,076 | B1* | 9/2002 | Burkey | G06F 9/4443 704/270 |
| 6,526,380 | B1* | 2/2003 | Thelen | G10L 15/32 704/251 |
| 7,533,018 | B2* | 5/2009 | Ma | G10L 15/063 704/243 |
| 7,720,682 | B2* | 5/2010 | Stephanick | G06F 17/2735 704/252 |
| 7,769,142 | B2* | 8/2010 | Selbie | H04L 12/581 379/68 |
| 7,881,936 | B2* | 2/2011 | Longe | G06K 9/00422 704/257 |
| 8,204,746 | B2* | 6/2012 | Odinak | G10L 15/193 704/235 |
| 8,254,535 | B1* | 8/2012 | Madhavapeddi | H04M 3/493 379/88.14 |
| 8,346,549 | B2* | 1/2013 | Ljolje | G10L 15/285 704/231 |
| 8,447,285 | B1* | 5/2013 | Bladon | G10L 15/26 370/300 |
| 8,964,946 | B1* | 2/2015 | Scheet | G10L 15/26 379/88.01 |
| 2002/0046023 | A1* | 4/2002 | Fujii | G10L 15/30 704/231 |
| 2003/0236664 | A1* | 12/2003 | Sharma | G10L 15/08 704/251 |
| 2004/0019488 | A1* | 1/2004 | Portillo | G10L 15/1815 704/275 |
| 2004/0043758 | A1* | 3/2004 | Sorvari | G06F 17/30884 455/414.1 |
| 2004/0152055 | A1* | 8/2004 | Gliessner | G09B 5/06 434/169 |
| 2005/0017954 | A1* | 1/2005 | Kay | G06F 3/0233 345/169 |
| 2005/0175169 | A1* | 8/2005 | Boda | H04M 1/271 379/355.01 |
| 2005/0246325 | A1* | 11/2005 | Pettinati | G06F 3/0237 |
| 2006/0009980 | A1* | 1/2006 | Burke | G10L 15/32 704/270 |
| 2006/0041429 | A1* | 2/2006 | Amato | G10L 13/08 704/260 |
| 2006/0069564 | A1* | 3/2006 | Allison | G10L 15/08 704/257 |
| 2006/0149558 | A1* | 7/2006 | Kahn | G10L 15/063 704/278 |
| 2007/0208555 | A1* | 9/2007 | Blass | G10L 15/08 704/9 |
| 2008/0228296 | A1* | 9/2008 | Eilam | G06Q 10/10 700/94 |
| 2008/0270135 | A1* | 10/2008 | Goel | G10L 15/1822 704/257 |
| 2009/0030697 | A1* | 1/2009 | Cerra | G10L 15/30 704/275 |
| 2009/0326937 | A1* | 12/2009 | Chitsaz | G10L 15/24 704/235 |
| 2010/0121638 | A1* | 5/2010 | Pinson | G10L 15/02 704/235 |
| 2010/0138411 | A1* | 6/2010 | Judy | G06F 17/30746 707/723 |
| 2010/0158213 | A1* | 6/2010 | Mikan | H04M 3/42221 379/88.14 |
| 2010/0191520 | A1* | 7/2010 | Gruhn | G06F 3/0237 704/9 |
| 2010/0191530 | A1* | 7/2010 | Nakano | G10L 15/32 704/244 |
| 2011/0015928 | A1* | 1/2011 | Odell | G10L 15/30 704/257 |
| 2011/0054894 | A1* | 3/2011 | Phillips | G10L 15/07 704/235 |
| 2011/0054896 | A1* | 3/2011 | Phillips | G10L 15/30 704/235 |
| 2011/0054900 | A1* | 3/2011 | Phillips | G10L 15/30 704/235 |
| 2011/0066634 | A1* | 3/2011 | Phillips | G10L 15/22 707/769 |
| 2011/0143731 | A1* | 6/2011 | Ramer | G06Q 30/02 455/414.1 |
| 2012/0036147 | A1* | 2/2012 | Borst | H04L 12/585 707/769 |
| 2012/0179457 | A1* | 7/2012 | Newman | G10L 15/30 704/201 |
| 2012/0179469 | A1 | 7/2012 | Newman et al. | |
| 2012/0215539 | A1* | 8/2012 | Juneja | G10L 15/30 704/254 |
| 2012/0271631 | A1* | 10/2012 | Weng | G10L 15/063 704/243 |
| 2013/0030810 | A1* | 1/2013 | Kopparapu | G06F 17/30873 704/260 |
| 2013/0080171 | A1* | 3/2013 | Mozer | G10L 15/22 704/251 |
| 2013/0262106 | A1* | 10/2013 | Hurvitz | G10L 15/183 704/235 |
| 2013/0266127 | A1* | 10/2013 | Schachter | G10L 25/48 379/88.01 |

OTHER PUBLICATIONS

Everitt et al., "Disambiguating Speech Commands Using Physical Context," ICMI '07, Proceedings of the 9th International Conference on Multimodal Interfaces, 2007, 8 pages.
Hakkani-Tur, Dilek et al., "Unsupervised and Active Learning in Automatic Speech Recognition for Call Classification," Proceedings (ICAASP '04) IEEE International Conferences on Acoustics, Speech, and Signal Processing, 2004, 4 pages.
International Search Report and Written Opinion in International Application No. PCT/US2013/047780, mailed Aug. 23, 2013, 10 pages.
International Search Report and Written Opinion in International Application No. PCT/US2014/034686, mailed Jul. 10, 2014, 10 pages.
International Preliminary Report on Patentability in International Application No. PCT/US2013/062545, mailed May 14, 2015, 11 pages.

* cited by examiner

US 9,570,076 B2

METHOD AND SYSTEM FOR VOICE RECOGNITION EMPLOYING MULTIPLE VOICE-RECOGNITION TECHNIQUES

CROSS-REFERENCE TO RELATED APPLICATIONS

This application claims the benefit of commonly assigned U.S. Application No. 61/719,983, filed on 30 Oct. 2012, the contents of which are incorporated herein by reference.

FIELD OF THE INVENTION

The present invention relates to electronic devices such as mobile devices and, more particularly, to methods and systems for performing voice recognition at or in relation to such electronic devices.

BACKGROUND OF THE INVENTION

Mobile devices such as cell phones, personal digital assistants (PDAs), and smart phones, as well as a variety of other electronic devices, increasingly include voice recognition capabilities. Through their ability to recognize incoming voice signals from users (or others), such mobile devices or other electronic devices are able to achieve high levels of interactivity with the users (or others) and to provide numerous valuable functions that depend upon voice input.

Although technologies for performing voice recognition have been improving, accurate voice recognition remains a technical challenge. Although a variety of voice recognition technologies have been developed including, for example, acoustic matching and speech-to-text voice recognition, existing voice recognition technologies nevertheless each have their own strengths and weaknesses (further example, acoustic matching can produce more success with name-matching and speech-to-text can produce more flexibility for interpreting commands).

Therefore, although any given mobile device or other electronic device will typically be designed to utilize a particular type of voice recognition technology deemed to be suitable for the mobile device or other electronic device (or the particular applications on or performance goals for such mobile device or other electronic device) on which it is being implemented, nevertheless the implementation of the voice recognition technology on the mobile device or other electronic device will be limited in certain respects.

In view of the above, it would therefore be advantageous if improved methods or systems for performing voice recognition at or in relation to mobile devices or other electronic devices could be developed.

SUMMARY OF THE INVENTION

In at least one embodiment, the present disclosure relates to a method of voice recognition. The method includes receiving first voice input information by way of a receiver, converting by way of at least one processor the first voice input information or additional voice input information based at least indirectly upon the first voice input information into a first processed voice input portion, and performing by way of the at least one processor a word parsing operation with respect to the first processed voice input portion to identify at least two parsed word portions. The method further includes performing by way of the at least one processor at least one word spotting operation with respect to a first of the parsed word portions to generate a first revised word portion, performing by way of the at least one processor a first speech-to-text operation with respect to a second of the parsed word portions or to a corresponding portion of the first voice input information, the additional voice input information, or the first processed voice input portion corresponding to the second parsed word portion, so as to arrive at a second revised word portion, combining the first and second revised word portions to arrive at recognized voice information, and performing at least one action based at least in part upon the recognized voice information, wherein the at least one action includes outputting at least one signal by way of an output device.

In at least one additional embodiment, the present disclosure relates to a method of voice recognition. The method includes receiving first voice input information by way of a receiver on a mobile device and performing, by way of at least one processing device on the mobile device, first and second processing operations respectively with respect to first and second voice input portions, respectively, which respectively correspond to and are based at least indirectly upon different respective portions of the first voice input information. The first processing operation includes a speech-to-text operation and the second processing operation includes an alternate processing operation other than the speech-to-text operation. Additionally, the method includes generating recognized voice information based at least indirectly upon results from each of the first and second processing operations, and performing at least one action based at least in part upon the recognized voice information, where the at least one action includes outputting at least one signal by way of an output device on the mobile device.

In at least one further embodiment, the present disclosure relates to a system for voice recognition. The system includes at least one receiver configured to receive a first voice input signal, and at least one memory device configured to store at least one predefined word set. The system additionally includes at least one output device configured to provide an output signal, and at least one processing device coupled at least indirectly to each of the at least one receiver, the at least one memory device, and the at least one output device. The at least one processing device is configured to perform first and second operations respectively upon respective first and second portions of voice information based at least indirectly upon the first voice input signal, the first operation including performing of a speech-to-text conversion with respect to the first portion of the voice information, and the second operation including performing of a word spotting operation with respect to the second portion the voice information. Also, the at least one processing device is configured to combine results of the first and second operations at least indirectly to generate recognized voice information, and the at least one processing device is configured to cause the at least one output device to provide the output signal based at least in part upon the recognized voice information.

DETAILED DESCRIPTION

Embodiments described herein include, but are not limited to, improved methods or systems for performing voice recognition on or in relation to mobile devices or other electronic devices. In at least some example embodiments, such improved voice recognition methods or systems allow for more accurate speech recognition in such a mobile device or other electronic device that enables the mobile device or other electronic device to interact with a user or other person so as approach emulating a natural conversation with that user or other person. Also, in at least some example embodiments, the system for performing voice recognition is the mobile device or other electronic device itself, or encompasses multiple such devices.

Figure 1:
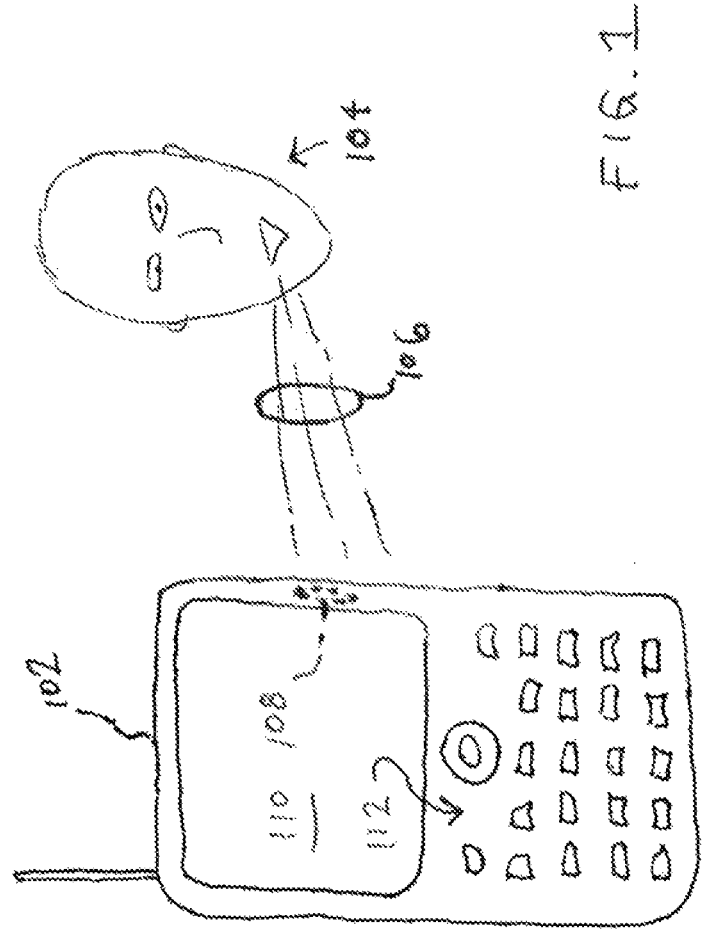
FIG. 1 shows in schematic form an example electronic device that, in the present example, is a mobile device, on which can be implemented methods or systems for voice recognition (or which itself can constitute such as a system) in accordance with embodiments disclosed herein, interacting with a source of voice input (e.g., a user of the device)

Referring to FIG. 1, an example mobile device 102 is shown to be in communication with a user 104. More particularly, as shown, the user 104 provides voice input (or vocalized information or speech) 106 that is detected by the mobile device 102 by way of a microphone (or other sound receiver) 108. Further as shown, in the present embodiment the mobile device 102 includes a touchscreen display 110 that is both able to display visual images and also able to receive or sense touch type inputs as provided by way of a user's finger or other touch input device such as a stylus. Notwithstanding the presence of the touchscreen display 110, in the present embodiment the mobile device 102 also has a number of discrete keys or buttons 112 that serve as input devices of the mobile device. However, in other embodiments such keys or buttons (or any particular number of such keys or buttons) need not be present, and rather the touchscreen display 110 can serve as the primary or only user input device. Although FIG. 1 particularly shows the mobile device 102 as including the touchscreen display 110 and keys or buttons 112, these features are only intended to be examples of components/features on a mobile device, and in other embodiments the mobile device 102 need not include one or more of these features and/or can include other features in addition to or instead of these features.

The mobile device 102 is intended to be representative of a variety of mobile devices including, for example, cellular telephones, personal digital assistants (PDAs), smart phones, or other handheld or portable electronic devices. In alternate embodiments, the mobile device can also be a headset (e.g., a Bluetooth headset), MP3 player, battery-powered device, a watch device (e.g., a wristwatch) or other wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other mobile device. Additionally, although FIG. 1 particularly shows the mobile device 102, the mobile device is intended to be representative not only of mobile devices but also of other electronic devices. Indeed, embodiments of the present disclosure are intended to be applicable to any of a variety of electronic devices that are capable of or configured to receive voice input or other sound inputs that are indicative or representative of vocalized information.

Figure 2:
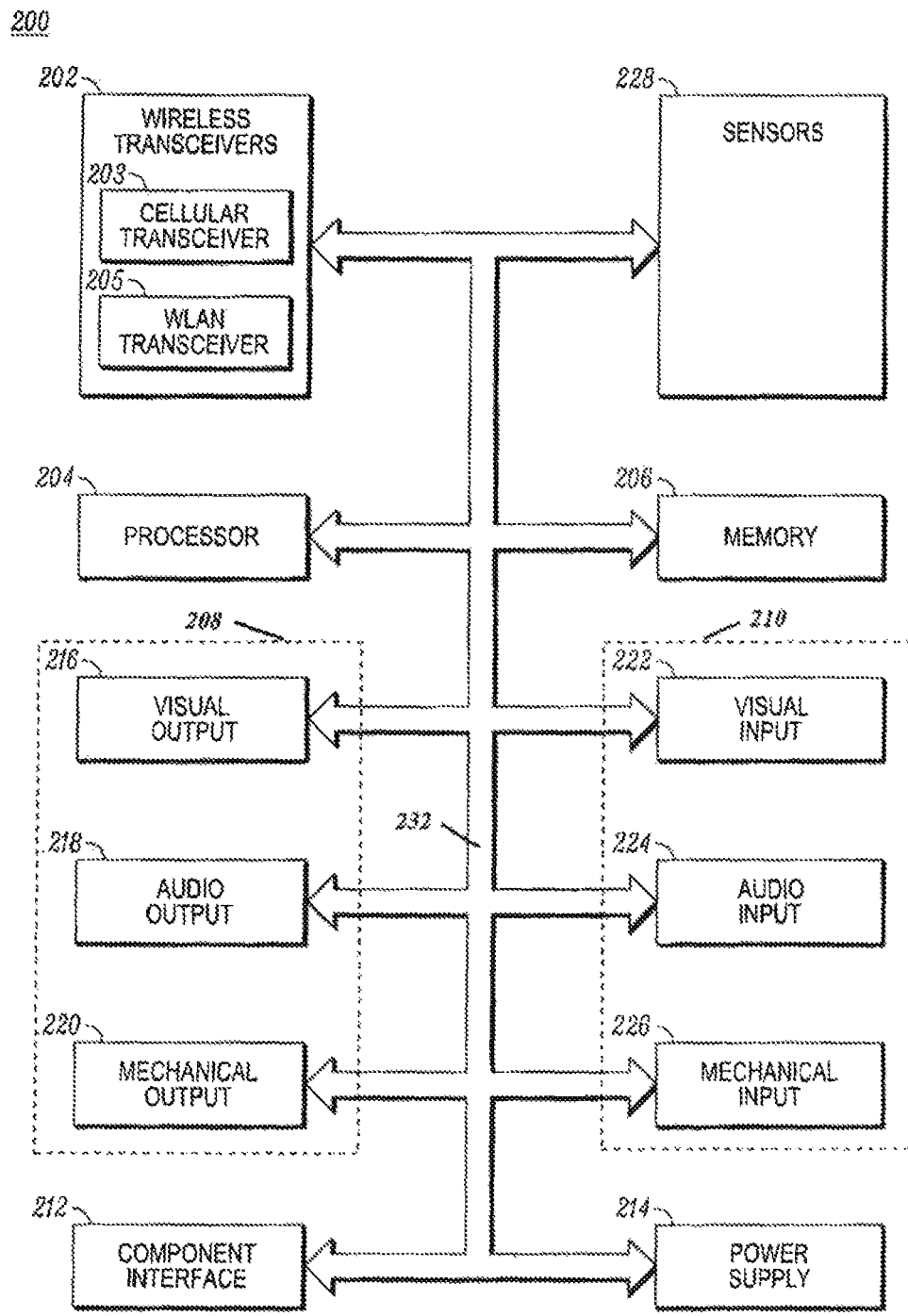
FIG. 2 is a block diagram showing example components of the mobile device of FIG. 1.

Referring to FIG. 2, there is provided a block diagram illustrating example internal components 200 of the mobile device 102 of FIG. 1, in accordance with the present embodiment. As shown in FIG. 2, the internal components 200 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 preferably also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the present embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-à-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the mobile device 102 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the mobile device 102 is capable of communicating with any of a variety of other devices or systems (not shown) including, for example, other mobile devices, web servers, cell towers, access points, other remote devices, etc. Depending upon the embodiment or circumstance, wireless communication between the mobile device 102 and any arbitrary number of other devices or systems can be achieved.

Operation of the wireless transceivers 202 in conjunction with others of the internal components 200 of the mobile device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as the microphone 108 of FIG. 1 (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228. The sensors 228 can include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the mobile device 102. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the mobile device 102 includes the touch screen display 110, the touch screen display can be considered to constitute both a visual output device and a mechanical input device (by contrast, the keys or buttons 112 are merely mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the mobile device 102 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), and informational data. Each operating system includes executable code that controls basic functions of the mobile device 102, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the mobile device 102 to perform a process such as the process for voice recognition shown in FIG. 3 and discussed further below. Finally, with respect to informational data, this is non-executable code or information that can be referenced and/or manipulated by an operating system or program for performing functions of the mobile device 102.

Figure 3:
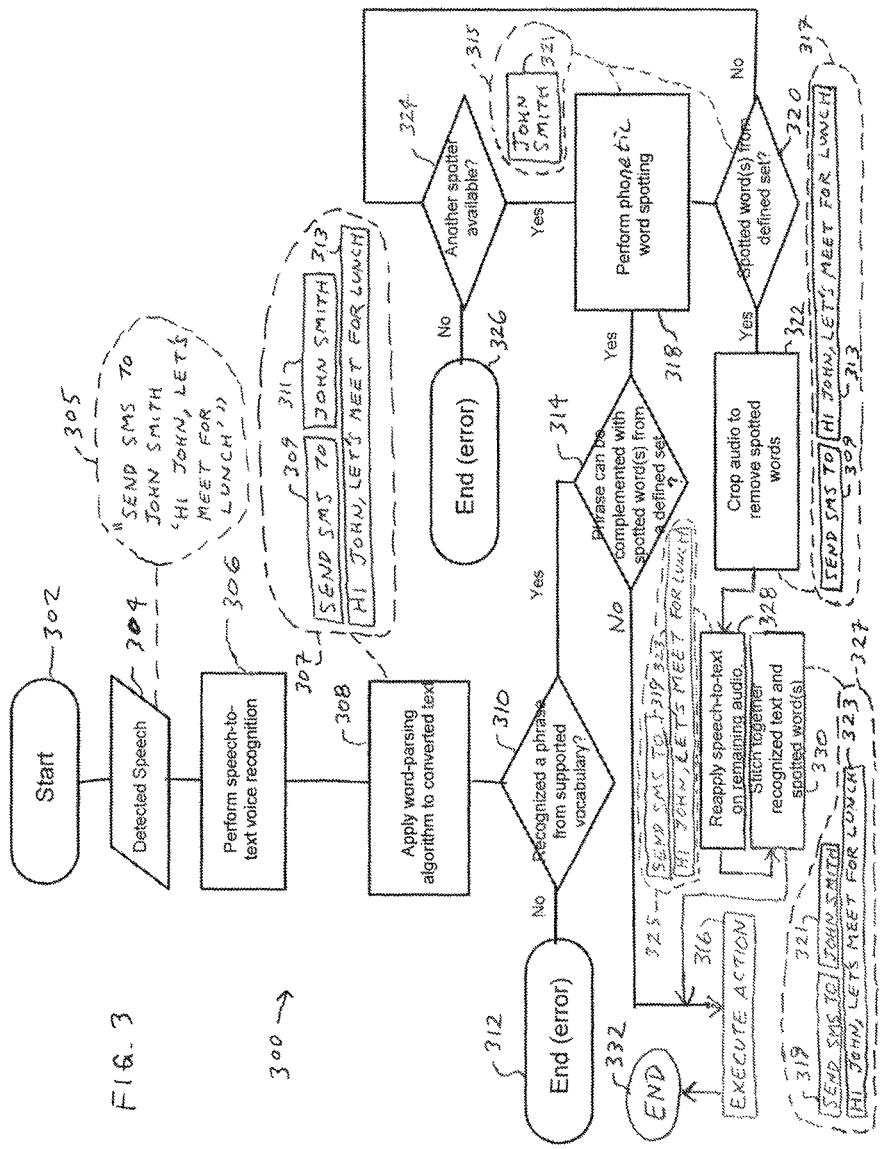
FIG. 3 is a flow chart showing various example steps of a process for voice recognition that can be implemented on the mobile device of FIGS. 1 and 2.

Referring now to FIG. 3, a flowchart 300 is provided that shows example steps of an example process that can be performed by the mobile device 102 of FIGS. 1 and 2 to perform voice recognition and related operations in accordance with at least some embodiments of the present disclosure. Execution of the process is achieved particularly under the control of the processor 204, which governs the operation of and interacts with the microphone 108 (one of the audio input devices 224), the memory portion 206, and other(s) of the internal components 200 of the mobile device 102. As discussed in further detail below, the process involves not only receiving signals from the microphone 108 (upon the microphone receiving the voice input 106) but also then involves processing those signals to perform voice recognition, followed then in at least some embodiments by one or more additional actions taken by the mobile device 102 in response to or based upon the voice recognition.

As shown, the process represented by the flowchart 300 begins at a start step 302 and, upon commencing, then at a step 304 detects speech such as the voice input 106 shown in FIG. 1. That is, the voice input 106 signals are received by the microphone 108 and electrical signals are produced by the microphone in response to receiving the voice input that are in turn communicated from the microphone to the processor 204, where the electrical signals are representative of the voice input 106. For example, as represented by a bubble 305, in one example scenario, the voice input 106 that is received at the microphone 108 and communicated to the processor 204 is the statement from the user 104 "Send SMS to John Smith. 'Hi John, Let's meet for lunch.'" It should be appreciated that, although the voice input 106 in the present example is provided from a live human being who is the user 104, in other circumstances or embodiments the voice input could come from another source, such as a loudspeaker that outputs voiced (or voicelike) sounds.

Next, at a step 306, the processor 204 performs speech-to-text voice recognition upon the detected speech, that is, upon the electrical signals received from the microphone 108 (or signals entirely or partly based upon or derived therefrom). Any of a variety of conventional or standard or otherwise available speech-to-text algorithms can be employed at the step 306 to perform the speech-to-text voice recognition including, for example, algorithms available from Google Inc. of Mountain View, Calif. and Apple Inc. of Cupertino, Calif. (e.g., Siri).

Further, at a step 308, the processor 204 then applies a word-parsing algorithm to the converted text, with the "converted text" being the result of the performing of the speech-to-text voice recognition in step 306. Again, the word parsing algorithm can be a conventional or standard or otherwise available word parsing algorithm. The word parsing algorithm operates to break up or parse (if possible) the converted text into two or more parsed phrases—that is, two or more groups of one or more words each, where the words of each respective group are related to one another in manner(s) (e.g., based upon logical, grammatical, or other considerations) that are inapplicable to the other words of the converted text that are excluded from the respective group (but that may belong to other group(s)). For example, assuming again that the particular voice input shown in the bubble 305 was received, then as illustrated by a bubble 307 the result of application of the word-parsing algorithm in the step 308 is to divide up the converted text (converted from the detected voice input) into a first block 309 containing the words "Send SMS to", a second block 311 containing the words "John Smith", and a third block 313 containing the words "Hi John, Let's meet for lunch."

It should be appreciated that, although the term "parsed phrase" is used herein, the parsing algorithm employed in any given embodiment need not be specifically directed toward identifying groups of one or more words that technically constitute "phrases" in a grammatical sense. Rather, the parsing algorithm employed in any given embodiment can, depending upon the embodiment or circumstance, operate to identify groups of words that can be single words, groups or more than a single word, phrases, clauses, or other word groupings. Although typically the words of a group having multiple words will be successive words, in some embodiments or circumstances a group of multiple words can include words that are not all in succession with one another—that is, a group can for example include two words separated from one another by one or more other words that are not part of that group. Also, while it is envisioned that typically voice input will include sounds that corresponds to intelligible words having actual meaning, in some embodiments or circumstances it is possible that the voice input will include one or more words intermingled with one or more sounds that have no meanings. In such embodiments or circumstances, the parsing algorithm can also operate to identify groups of words having one or more words and also identify such other sounds and to separate those sounds from the groups of words.

Subsequent to the step 308, the process of the flow chart 300 continues at a step 310, at which the processor 204 determines whether any of the parsed phrases (parsed as a result of the step 308, for example, the blocks 309, 311, and 313) are recognized from supported vocabulary. If the answer is no, then the process immediately concludes at a step 312. Ending of the process in this manner is an error, since in this case none of the parsed phrases has been particularly recognized. Alternatively, if one or more parsed phrases are recognized at the step 310, then the process advances to a step 314, at which the processor 204 further determines whether any of the parsed phrases can be complemented with spotted words from a defined (or predefined) set. If the answer is no, then the process automatically advances from the step 314 to a step 316 discussed further below. Alternatively, if it is determined that one or more of the parsed phrases can be complemented with spotted words from a defined set, then the process instead advances from the step 314 to a step 318.

It should be appreciated that whether the process advances from the step 314 to the step 316 or from the step 314 to the step 318 can depend upon the particular content of the voice input 106 received at the step 304. Thus, with respect to the example voice input shown in the bubble 305 and corresponding converted text shown in the bubble 307, in which the speech includes the three different parsed phrases corresponding to the blocks 309, 311 and 313, the performing of the step 314 can result for example in a determination that the parsed phrase of the block 311 can potentially be processed as spotted words even though the parsed phrases of the blocks 309, 313 are inappropriate for treatment in this manner (correspondingly, the performing of the step 314 can result in a determination that the parsed phrases of the blocks 309, 313 can potentially be complemented by spotted words that can pertain to the parsed phrase of the block 311). It should also be noted that additionally that, if the voice input 106 received at the step 304 only included voice input corresponding to a single parsed (or parseable) phrase (further for example if the voice input only included the phrase "John Smith") that was determined to be suited for word spotting, then the process would also advance directly from the step 314 to the step 318.

Assuming that the process reaches the step 318, then phonetic word spotting is performed upon the parsed phrase(s) that were determined to be potentially complemented with spotted words. It should be appreciated that spotted words are typically a defined or limited vocabulary set that are matched by comparing against the phonetic fingerprint of a speaker. Arbitrary words cannot be formed using such a technique since in that case the technique would be essentially the same as speech-to-text processing. However, where a particular defined or limited set of terms is available, then the phonetic word spotting can be performed.

For example, with respect to the voice input 106 shown in the bubbles 305 and 307, the defined set can be the contacts in a phone book associated with the mobile device 102 (which can be, for example, stored in the memory portion 206 thereof and therefore be considered to be shown in FIG. 2 as included by the memory portion 206). Then, when the parsed phrases corresponding to the blocks 309 and 313 are identified as phrases that can be complemented with spotted word(s) and the parsed phrase (name) "John Smith" of the block 311 is correspondingly identified as eligible for phonetic word spotting at the step 314, then at the step 318 the process can particularly determine that this parsed phrase "John Smith" corresponds to one of the contacts in the phone book. More particularly as shown, in this example, as represented by a bubble 315, the parsed phrase "John Smith" is identified due to the performing of the phonetic word spotting at the step 318 as the particular contact "John Smith" from the phone book that is shown as a block 321.

Although the above discussion presumes that the phonetic word spotting at the step 318 is successful, in terms of determining spotted words from a defined set, the operation at the step 318 is not always successful. That is in some circumstances or with respect to some parsed phrases, the phonetic word spotting is not successful, that is a word spotting match from the defined set is not achieved. The step 320, which is shown to occur after the step 318, reflects this. That is, at the step 320, it is determined whether in fact the phonetic word spotting performed at the step 318 was successful. And, if upon the performing of the step 318 it is determined at the step 320 that the word spotting was successful—that is, it is determined that the spotted words are from a defined set—then the process advances from the step 320 to a step 322 (discussed further below). Alternatively, if it is determined at the step 320 that the word spotting was unsuccessful—that is, the spotted words were not from a defined set (or not from the defined set in relation to which the word spotting was performed in the step 318)—, then the process advances to a step 314, at which it is determined whether another spotter (e.g., another defined set) is available for the purpose of performing word spotting. If the answer is yes, the process returns from the step 324 back to the step 318, at which phonetic word spotting is performed again (e.g., with respect to another defined word set). Alternatively, if no other spotter is available, then the process ends at a step 326, which again is an error end step since the spotting was inconclusive.

As already discussed above, if the word spotting performed at the step 318 is determined to have been successful at the step 320, then the process advances to the step 322. Upon reaching the step 322, the processor 204 then performs an additional step in which the audio information is cropped to remove the spotted words that were identified and addressed in the steps 318 and 320 (and a possible step 324). For example, with respect to the example voice input 106 shown in the bubbles 305 and 307 discussed above, the second block 311 with respect to which word spotting was performed is cropped from the voice input such that only the first block 309 ("Send SMS to") and the third block 313 ("Hi John. Let's meet for lunch.") remains, as shown in a bubble 317.

Further in this regard, although the bubble 317 provided in relation to the step 322 of FIG. 3 shows the voice input remaining after the cropping to particularly include certain of the parsed phrases generated at the step 308 from the application of the word-parsing algorithm to the converted text (e.g., the blocks 309 and 313 in the bubble 317), in some embodiments or circumstances the remaining voice input is not necessarily such parsed phrases. Rather, in some embodiments or circumstances, the remaining voice input resulting from the performing of the step 322 is derived by removing portion(s) of the converted text resulting from the step 306 (prior to the application of the word-parsing algorithm in the step 308) that correspond to the parsed phrase (or phrases) identified as suitable for word spotting (e.g., by removing portions of the converted text corresponding to the parsed phrase of the second block 311), or even by removing portion(s) of the electrical signals (e.g., the audio signals) originally representative of the voice input 106, prior to the performing of the step 306, which correspond to the parsed phrase (or phrases) identified as suitable for word spotting. Thus, in such embodiments or circumstances, the voice input remaining after the performing of the cropping 322 is not technically one or more of the parsed phrases generated by the step 308 as shown in the bubble 317, but rather includes information/signal portions that remain after certain other information/signal portions corresponding to the parsed phrase(s) in relation to which word spotting was performed have been removed. Therefore, notwithstanding the showing of the blocks 309, 313 corresponding to parsed phrases in the bubble 317 in FIG. 3, the step 322 of FIG. 3 should be understood as broadly encompassing all of these various possibilities.

Next, at a step 328, the processor 204 then reapplies the speech-to-text algorithm to the remaining audio, that is, to the voice portions remaining (e.g., the blocks 309 and 313) after the cropping is performed at the step 322. That is, in view of the above discussion concerning the step 322, at the step 328 the speech-to-text algorithm is applied specifically to those of the parsed phrases resulting from the step 308 with respect to which word spotting was deemed inapplicable, or to the portions of the converted text or audio signals that are left after the removal from the converted text or audio signals (at the step 322) of information/signal portion(s) corresponding to the parsed phrase(s) with to which word parsing was performed. Such operation in the step 328 results in final speech-to-text conversions of these parsed phrases (e.g., the blocks 309 and 313), or of the remaining portions of the converted text or audio signals corresponding to these parsed phrases.

For example, with the speech-to-text algorithm being applied to the blocks 309 and 313, the results of performing the step 328 are shown in a bubble 325, namely, a revised first block 319 ("Send SMS to") and a revised third block 323 "Hi, John. Let's meet for lunch."). Although in this example, the results of performing the step 328 are shown to be the same as the results of steps 306 and 308 insofar as the contents of the blocks 319 and 323 are shown to be identical to the contents of the blocks 309 and 313, in other circumstances the results will be slightly or significantly different between the original application of the speech-to-text voice recognition at the step 306 and the reapplication of the speech-to-text voice recognition at the step 328. Such differences can occur because, for example, the presence of phrases that are to be word spotted can corrupt the original speech-to-text conversion performed at the step 306, or because different respective speech-to-text algorithms are employed in the steps 306 and 328, respectively.

Once the speech-to-text algorithm has been reapplied to the remaining audio in the step 328, then all of the voice recognition processing to be performed directly or indirectly in relation to the voice input 106 has been completed. Subsequently, at a step 330, the processor 204 then stitches together the various portions of text recognized via the speech-to-text conversion of the step 328 and the spotted word processing of the steps 318, 320, and 324 to arrive at the overall result of the voice recognition process. For example, continuing with the above-discussed example involving the particular voice input 106 shown in FIG. 3, at the step 330 the stitched-together text is shown in a bubble 325 to include, in combination, the revised first block 319 ("Send SMS to"), the revised second block 321 ("John Smith"), and the revised third block 323 ("Hi John. Let's meet for lunch."). Once the step 330 is completed, then the process again advances to perform the step 316 and, upon completion of the step 316, the process ends at a step 332.

With respect to the step 316 (which again can be arrived at either from the step 314 or from the step 330), that step generally can be considered to be representative of one or more actions or operations being performed by the processor 204 and/or by one or more others of the internal components 200 of the mobile device 102 (typically at the command of the processor 204), or by the mobile device as a whole (typically at the command of the processor 204).

For example, the action taken at the step 316 can include the displaying of the recognized voice input on the touch screen display 110, or the outputting of one or more signal(s) that are responsive to the recognized voice input. Further for example, with respect to the example voice input 106 shown in the bubble 305, processed as the recognized voice input shown in the bubble 325, the responsive action performed at the step 316 can be that the mobile device 102 automatically populates a SMS (Short Message Service) text message with the commanded text message ("Hi, John. Let's meet for lunch."). The action taken at the step 316 can then further include automatically sending that SMS text message immediately to a remote location apart from the mobile device (e.g., by wireless transmission), or alternatively include the providing of a signal to the user 104 of the mobile device 102 that the SMS text message is ready to be sent but that the mobile device is awaiting a final command from the user to send the message.

The aforementioned example actions are only a few of numerous possible action(s) or operation(s) that can be performed at the step 316. It should particularly be appreciated that, in at least some embodiments, the action taken by the mobile device 102 involves determining an appropriate response to recognized voice input so that the mobile device can send a communication back to the user or to another person or mobile device or other machine that is responsive to the original voice input 106. Given this to be the case, it should further be understood that, in at least some embodiments, the process represented by the flow chart 300 can be repeated over and over again, with numerous voice inputs being received and numerous responses being sent by the mobile device 102 in response to those respective voice inputs, respectively. In this manner, a conversation between the mobile device 102 and the user 104, or between the mobile device 102 and another mobile device or other machine, can occur.

Thus, it is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A computer-implemented method comprising:
   receiving audio data that encodes an utterance;
   obtaining, as a result of performing speech-to-text voice recognition on the audio data, a first transcription of the utterance;
   segmenting the first transcription into two or more discrete terms;
   determining that a first particular term from among the two or more discrete terms is included among a predefined set of terms that are associated with a word spotting process that involves determining whether an acoustic fingerprint of a given portion of audio data is an acoustic match with one or more given terms without performing speech-to-text voice recognition;
   determining that the two or more discrete terms other than the first particular term are included among an additional predefined set of terms that are associated with the predefined set of terms that are associated with a word spotting process;
   in response to determining that the two or more discrete terms other than the first particular term are included among the additional predefined set of terms that are associated with the predefined set of terms that are associated with the word spotting process, obtaining, as a result of performing the word spotting process on a portion of the audio data that corresponds to a second particular term from among the two or more discrete terms other than the first particular term without re-performing speech-to-text voice recognition on the portion of the audio data, an indication that an acoustic fingerprint associated with the portion of the audio data that corresponds to the second particular term is an acoustic match with one or more terms of the predefined set of terms that are associated with the word spotting process;
   obtaining, as a result of re-performing speech-to-text voice recognition on a portion of the audio data that does not correspond to the second particular term, a second transcription of the utterance using the portion of the audio data that does not correspond to the second particular term;
   generating a third transcription of the utterance based at least on (i) the second transcription of the utterance that was obtained as a result of re-performing speech-to-text voice recognition on the portion of the audio data that does not correspond to the second particular term, and (ii) the one or more terms of the predefined set of terms that are indicated, as a result of performing the word spotting process on the portion of the audio data that corresponds to the second particular term without re-performing speech-to-text voice recognition of the audio data, as an acoustic match with the portion of the audio data that corresponds to the second particular term; and
   providing the third transcription of the utterance for output.

2. The method of claim 1, wherein segmenting the first transcription into two or more discrete terms is based on a grammar structure of the first transcription.

3. The method of claim 1, wherein the predefined set of terms that are associated with the word spotting process includes terms entered by a user.

4. The method of claim 1, wherein the first transcription and the second transcription are obtained using different speech-to-text algorithms.

5. The method of claim 1, wherein providing the third transcription of the utterance for output comprises:
   providing the third transcription of the utterance to an application.

6. The method of claim 1, wherein generating the third transcription comprises:
   concatenating (i) the second transcription of the utterance that was obtained as a result of re-performing speech-to-text voice recognition on the portion of the audio data that does not correspond to the second particular term, and (ii) the one or more terms of the predefined set of terms that are indicated, as a result of performing the word spotting process on the portion of the audio data that corresponds to the second particular term without re-performing speech-to-text voice recognition of the audio data, as an acoustic match with the portion of the audio data that corresponds to the second particular term.

7. The method of claim 1, comprising:
   performing the word spotting process on a portion of the audio data that corresponds to the second particular term.

8. A system comprising:
   one or more computers and one or more storage devices storing instructions that are operable, when executed by the one or more computers, to cause the one or more computers to perform operations comprising:
receiving audio data that encodes an utterance;
obtaining, as a result of performing speech-to-text voice recognition on the audio data, a first transcription of the utterance;
segmenting the first transcription into two or more discrete terms;
determining that a first particular term from among the two or more discrete terms is included among a predefined set of terms that are associated with a word spotting process that involves determining whether an acoustic fingerprint of a given portion of audio data is an acoustic match with one or more given terms without performing speech-to-text voice recognition;
determining that the two or more discrete terms other than the first particular term are included among an additional predefined set of terms that are associated with the predefined set of terms that are associated with a word spotting process;
in response to determining that the two or more discrete terms other than the first particular term are included among the additional predefined set of terms that are associated with the predefined set of terms that are associated with the word spotting process, obtaining, as a result of performing the word spotting process on a portion of the audio data that corresponds to a second particular term from among the two or more discrete terms other than the first particular term without re-performing speech-to-text voice recognition on the portion of the audio data, an indication that an acoustic fingerprint associated with the portion of the audio data that corresponds to the second particular term is an acoustic match with one or more terms of the predefined set of terms that are associated with the word spotting process;
obtaining, as a result of re-performing speech-to-text voice recognition on a portion of the audio data that does not correspond to the second particular term, a second transcription of the utterance using the portion of the audio data that does not correspond to the second particular term;
generating a third transcription of the utterance based at least on (i) the second transcription of the utterance that was obtained as a result of re-performing speech-to-text voice recognition on the portion of the audio data that does not correspond to the second particular term, and (ii) the one or more terms of the predefined set of terms that are indicated, as a result of performing the word spotting process on the portion of the audio data that corresponds to the second particular term without re-performing speech-to-text voice recognition of the audio data, as an acoustic match with the portion of the audio data that corresponds to the second particular term; and
providing the third transcription of the utterance for output.

9. The system of claim 8, wherein segmenting the first transcription into two or more discrete terms is based on a grammar structure of the first transcription.

10. The system of claim 8, wherein the predefined set of terms that are associated with the word spotting process includes terms entered by a user.

11. The system of claim 8, wherein the first transcription and the second transcription are obtained using different speech-to-text algorithms.

12. The system of claim 8, wherein providing the third transcription of the utterance for output comprises:
providing the third transcription of the utterance to an application.

13. The system of claim 8, wherein generating the third transcription comprises:
concatenating (i) the second transcription of the utterance that was obtained as a result of re-performing speech-to-text voice recognition on the portion of the audio data that does not correspond to the second particular term, and (ii) the one or more terms of the predefined set of terms that are indicated, as a result of performing the word spotting process on the portion of the audio data that corresponds to the second particular term without re-performing speech-to-text voice recognition of the audio data, as an acoustic match with the portion of the audio data that corresponds to the second particular term.

14. The system of claim 8, wherein the operations further comprise:
performing the word spotting process on a portion of the audio data that corresponds to the second particular term.

15. A non-transitory computer-readable medium storing software comprising instructions executable by one or more computers which, upon such execution, cause the one or more computers to perform operations comprising:
receiving audio data that encodes an utterance;
obtaining, as a result of performing speech-to-text voice recognition on the audio data, a first transcription of the utterance;
segmenting the first transcription into two or more discrete terms;
determining that a first particular term from among the two or more discrete terms is included among a predefined set of terms that are associated with a word spotting process that involves determining whether an acoustic fingerprint of a given portion of audio data is an acoustic match with one or more given terms without performing speech-to-text voice recognition;
determining that the two or more discrete terms other than the first particular term are included among an additional predefined set of terms that are associated with the predefined set of terms that are associated with a word spotting process;
in response to determining that the two or more discrete terms other than the first particular term are included among the additional predefined set of terms that are associated with the predefined set of terms that are associated with the word spotting process, obtaining, as a result of performing the word spotting process on a portion of the audio data that corresponds to a second particular term from among the two or more discrete terms other than the first particular term without re-performing speech-to-text voice recognition on the portion of the audio data, an indication that an acoustic fingerprint associated with the portion of the audio data that corresponds to the second particular term is an acoustic match with one or more terms of the predefined set of terms that are associated with the word spotting process;
obtaining, as a result of re-performing speech-to-text voice recognition on a portion of the audio data that does not correspond to the second particular term, a second transcription of the utterance using the portion of the audio data that does not correspond to the second particular term;

generating a third transcription of the utterance based at least on (i) the second transcription of the utterance that was obtained as a result of re-performing speech-to-text voice recognition on the portion of the audio data that does not correspond to the second particular term, and (ii) the one or more terms of the predefined set of terms that are indicated, as a result of performing the word spotting process on the portion of the audio data that corresponds to the second particular term without re-performing speech-to-text voice recognition of the audio data, as an acoustic match with the portion of the audio data that corresponds to the second particular term; and providing the third transcription of the utterance for output.

16. The medium of claim 15, wherein segmenting the first transcription into two or more discrete terms is based on a grammar structure of the first transcription.

17. The medium of claim 15, wherein the first transcription and the second transcription are obtained using different speech-to-text algorithms.

18. The medium of claim 15, wherein providing the third transcription of the utterance for output comprises:

providing the third transcription of the utterance to an application.

19. The medium of claim 15, wherein generating the third transcription comprises:

concatenating (i) the second transcription of the utterance that was obtained as a result of re-performing speech-to-text voice recognition on the portion of the audio data that does not correspond to the second particular term, and (ii) the one or more terms of the predefined set of terms that are indicated, as a result of performing the word spotting process on the portion of the audio data that corresponds to the second particular term without re-performing speech-to-text voice recognition of the audio data, as an acoustic match with the portion of the audio data that corresponds to the second particular term.

20. The medium of claim 15, wherein the operations further comprise:

performing the word spotting process on a portion of the audio data that corresponds to the second particular term.

* * * * *